United States Patent [19]
Ellison

[11] Patent Number: 5,099,599
[45] Date of Patent: Mar. 31, 1992

[54] METHOD OF LAYING SOD FOR CONSERVING WATER IN LAWN MAINTENANCE

[76] Inventor: Edward J. Ellison, 16 Algonquin Trail, Oakland, N.J. 07436

[21] Appl. No.: 453,809

[22] Filed: Dec. 20, 1989

[51] Int. Cl.⁵ ............................................. A01C 1/00
[52] U.S. Cl. ........................................ 47/1.01; 47/56; 47/87
[58] Field of Search ........................ 47/56, 1.01, 87

[56] References Cited

U.S. PATENT DOCUMENTS

| | | | |
|---|---|---|---|
| 3,205,619 | 9/1965 | Henry | 47/9 |
| 3,302,323 | 2/1967 | Popa | 47/9 |
| 3,467,142 | 9/1969 | Boyle | 138/111 |
| 3,812,618 | 5/1974 | Wood | 47/56 |
| 3,890,910 | 6/1975 | Angruner | 111/1 |
| 3,898,940 | 8/1975 | Ede | 111/1 |
| 3,903,816 | 9/1975 | Brem | 111/1 |
| 3,905,313 | 9/1975 | Grether | 111/1 |
| 3,980,029 | 9/1976 | Huggett | 111/1 |
| 4,007,556 | 2/1977 | Gluck et al. | 47/56 |
| 4,023,506 | 5/1977 | Robey | 111/1 |
| 4,091,568 | 5/1978 | Zinter | 47/58 |
| 4,099,345 | 7/1978 | Loads | 47/56 |
| 4,232,481 | 11/1980 | Chamoulaud | 47/56 |
| 4,336,668 | 6/1982 | Decker | 47/58 |
| 4,424,645 | 1/1984 | Rannali | 47/56 X |
| 4,771,572 | 9/1988 | Higa | 47/58 |
| 4,786,550 | 11/1989 | McFarland | 428/283 |
| 4,819,372 | 4/1989 | Schurholz | 47/9 |
| 4,833,822 | 5/1989 | DiGrassi | 47/9 |

FOREIGN PATENT DOCUMENTS 740166 3/1970 Belgium .
2616161 10/1977 Fed. Rep. of Germany .

*Primary Examiner*—David A. Scherbel
*Assistant Examiner*—Linda J. Watson
*Attorney, Agent, or Firm*—Jones, Day, Reavis & Pogue

[57] ABSTRACT

A method for conserving water in lawn maintenance is described. According to the method, a layer of of a water-absorbent, nonbiodegradable material is provided between the ground and a layer of sod. This absorbent layer retains water which may be reached by the roots of the plants in the sod layer. This layer may also be used to retain lawn chemicals. The lawn produced by the foregoing method is also described.

14 Claims, 1 Drawing Sheet

METHOD OF LAYING SOD FOR CONSERVING WATER IN LAWN MAINTENANCE

BACKGROUND OF THE INVENTION

The present invention relates to a method for conserving water in maintenance of planted expanses of grass or other ground covers, such as ivy, pachysandra, myrtle, and the like, referred to herein as "lawns" regardless of the nature of the planting. The present invention is applicable in any situation where the ground has little or no water holding capacity, as is the case, for example, of sand or shale. The invention is particularly applicable for new construction and where the lawn is provided by laying a sod of grass or other ground cover. In such situations, water that penetrates the planted layer rapidly percolates downward through the ground below where the roots of the grass or other ground cover can reach it. This necessitates frequent and sometimes daily watering for the life of the lawn. In order to overcome this disadvantage, the present invention provides a ne method for conserving water under the planted layer to aid in lawn maintenance.

SUMMARY OF THE INVENTION

The present invention overcomes the foregoing disadvantages of laying sod directly on ground having little or no water retention by providing a durable layer that will not biodegrade over the life of the lawn to be interposed between said ground and sod layer. Specifically, the invention provides such a nonbiodegradable layer with a water holding capacity below the sod. Water is retained in such layer, thus enabling the roots of the grass or other ground cover to draw on this water for one or more days to avoid the necessity of daily watering of the lawn.

The layer described above will retain not only water but also lawn chemicals, including fertilizers, pesticides, fungicides and the like; which may from time to time be applied to the lawn, thereby decreasing the depletion of such lawn additives from below the planted layer and also decreasing the leaching of such lawn additives into the water table where they may cause pollution.

DESCRIPTION OF THE INVENTION

Figure 1:
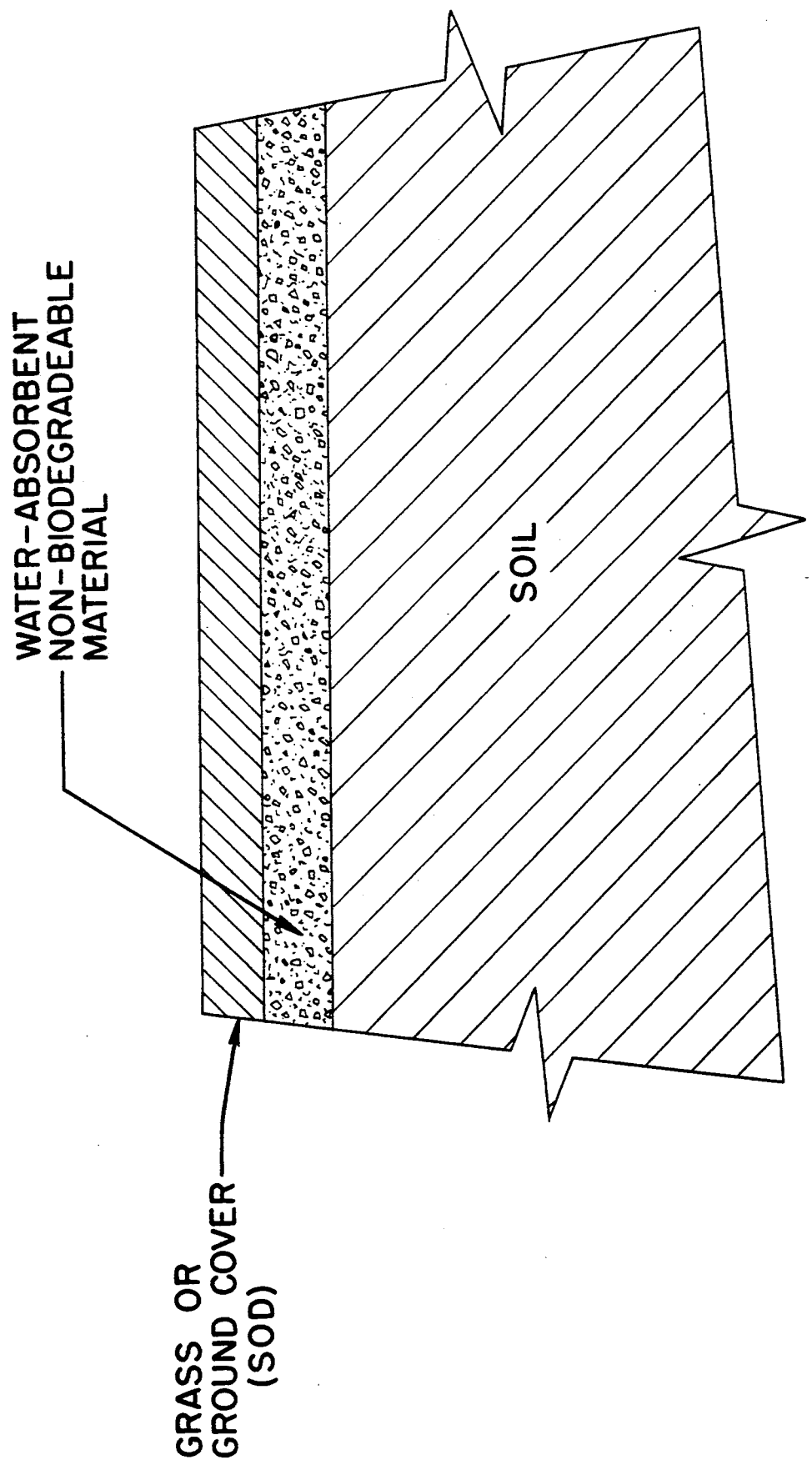
FIG. 1 is a schematic illustration of a durable layer of a water-absorbent, non-biodegradable material interposed above the ground and below the sod in accordance with the method of the present invention.

In accordance with the invention, a durable layer of a water-absorbent, non-biodegradable material is interposed above the ground and below the sod, as schematically illustrated in FIG. 1. This durable layer is not biodegradable by bacteria and organisms normally found in the soil or ground nor is it erodible by the elements. This layer is water absorbent and water retentive and can hold water in an amount sufficient to provide water for the lawn for at least one day and preferably two or three days. The layer holds the water in a usable manner which allows it to be recovered to provide water for the lawn.

One example of such a material is sheet sponge of the open pore variety. Examples of such sheet sponge include polyurethane and polypropylene. The layer of sheet sponge preferably should be of a thickness of at least one-half inch. Use of such a material in sheet form ensures uniformity of the layer. Alternatively, the layer may comprise pieces, chunks, balls, or the like of a water-absorbent, non-biodegradable material, which are dispersed over the top of the ground or mixed into the top soil to provide an approximately uniform layer, preferably of a thickness of at least one inch. The roots of the sod layer can penetrate into the absorbent layer and draw water directly from the stored water supply held in the absorbent layer.

The ground is prepared in the known manner for laying sod or other ground covers. In the case of new construction, for example, the surface layer of soil is graded to provide a relatively level surface. In accordance with the present invention, a layer of water-absorbent, non-biodegradable material, such as sheet sponge, is spread above the ground. The sod layer of grass or other ground cover is then spread over the absorbent layer. Alternatively, the planted layer may be created by spreading a layer of top soil or other growing medium over the absorbent layer and then spreading seed or making plantings. Other layers may be disposed between the ground layer and the absorbent layer and between the absorbent layer and the planted layer.

The lawn is watered daily until the roots of the planted layer develop sufficiently to reach below said layer and into the absorbent layer. Depending on climate and weather conditions, this may take approximately three to eight weeks. After that time, watering may be reduced to every other day and then every third day, depending on climate and weather conditions.

An experiment was made using the present invention. A box was constructed having inside measurements of 18 inches by 26 inches and a depth of 5½ inches. Holes were drilled in the bottom of the box to permit drainage. A ground layer was prepared by providing a two (2) inch layer of sand. An absorbent layer, comprising a one-half (½) inch thick sheet of polyurethane foam measuring 18 inches by 13 inches was placed directly on the sand to cover one-half of the ground layer. The remaining half of the ground layer of sand received no such treatment. A continuous sod layer of grass was placed over the entire surface (half of which was the sheet layer and half of which was the sand). The box was placed in a sunny location and watered daily as the roots developed. The grass was cut periodically with a hand clipper as it grew.

After two months, it was observed that the roots of the sod placed over the sand grew into the sand, and the roots of the sod placed over the absorbent layer grew into the absorbent layer and continued for a short distance into the sand below the absorbent layer. It was further observed that during periods of dry conditions, the sod placed over the sand began to brown, whereas the sod placed over the absorbent layer remained green for a full three (3) days before beginning to brown. After one watering, the sod placed over the absorbent layer returned to green faster than the sod placed over the sand.

It is understood that the above-described combinations are merely illustrative of the many possible specific embodiments which represent applications of the present invention. Numerous and varied other arrangements can readily be devised in accordance with the principles of the present invention without departing from the spirit and scope thereof.

What is claimed is:

1. A method of laying sod comprising the steps of first providing a layer of a water-absorbent, non-biodegradable material and then providing a layer of sod of grass or other ground cover such that said absorbent layer lies below said sod layer.

2. A method in accordance with claim 1 wherein said step of providing an absorbent layer is practiced by providing said absorbent layer in sheet form.

3. A method in accordance with claim 2 wherein said absorbent layer comprises open pore sheet sponge.

4. A method in accordance with claim 3 wherein said absorbent layer has a thickness of at least one-half inch.

5. A method in accordance with claim 1 wherein said step of providing an absorbent layer is practiced by providing an approximately uniformly dispersed layer of a plurality of individual pieces of said water-absorbent, non-biodegradable material.

6. A method in accordance with claim 5 wherein said step of providing an absorbent layer is further practiced by mixing said individual pieces of said water-absorbent, non-biodegradable material with top soil.

7. A method in accordance with claim 6 wherein said absorbent layer has a thickness of at least one inch.

8. A lawn system comprising a layer of a water-absorbent, non-biodegradable material and a layer of sod of grass or other ground cover, wherein said absorbent layer lies below said sod layer.

9. A lawn in accordance with claim 8 wherein said absorbent layer is in sheet form.

10. A lawn in accordance with claim 9 wherein said absorbent layer comprises open pore sheet sponge.

11. A lawn in accordance with claim 10 wherein said absorbent layer has a thickness of at least one-half inch.

12. A lawn in accordance with claim 8 wherein said absorbent layer comprises an approximately uniformly dispersed layer of a plurality of individual pieces of said water-absorbent, non-biodegradable material.

13. A lawn in accordance with claim 8 wherein said absorbent layer comprises an approximately uniformly dispersed layer of a plurality of individual pieces of said water-absorbent, non-biodegradable material mixed with top soil.

14. A lawn in accordance with claim 13 wherein said absorbent layer has a thickness of at least one inch.

* * * * *